United States Patent [19]

Yamazaki

[11] Patent Number: 5,670,970
[45] Date of Patent: Sep. 23, 1997

[54] HEAD-MOUNT DISPLAY WITH OPPOSITE POLARITY REVERSAL FOR LEFT AND RIGHT SIDES

[75] Inventor: Yasuyuki Yamazaki, Matsudo, Japan

[73] Assignee: Canon Kabushiki Kaisha, Tokyo, Japan

[21] Appl. No.: 355,014

[22] Filed: Dec. 13, 1994

[30] Foreign Application Priority Data

Dec. 17, 1993 [JP] Japan .................................. 5-343246

[51] Int. Cl.⁶ .............................. H04N 13/04; G09G 3/36
[52] U.S. Cl. ............................ 345/8; 345/96; 348/53
[58] Field of Search ................................. 345/96, 95, 97, 345/98, 104, 38, 87, 8, 209, 1; 348/53

[56] References Cited

U.S. PATENT DOCUMENTS 4,806,776  2/1989  Kley .
5,506,705  4/1996  Yamamoto et al. .................. 359/40

FOREIGN PATENT DOCUMENTS 0351253  1/1990  European Pat. Off. .
2266428  10/1993  United Kingdom .

OTHER PUBLICATIONS

Patent Abstracts of Japan, vol. 16 No. 465 (E–1271), 28 Sep. 1992 & JP-A-04 165779 (Matsushita Electric Ind. Co. Ltd.) 11 Jun. 1992, *abstract*.

*Primary Examiner*—Mark R. Powell
*Attorney, Agent, or Firm*—Fitzpatrick, Cella, Harper & Scinto

[57] ABSTRACT

A liquid crystal display device and a method of driving the same comprising first and second XY-matrix liquid-crystal display panels provided with a switching device every pixel, and liquid crystal drives to supply video signals whose polarities are inverted every predetermined cycle to first and second liquid-crystal display panels so that the polarities of video signals supplied to the first and second liquid-crystal display panels simultaneously may be reverse to each other.

22 Claims, 6 Drawing Sheets

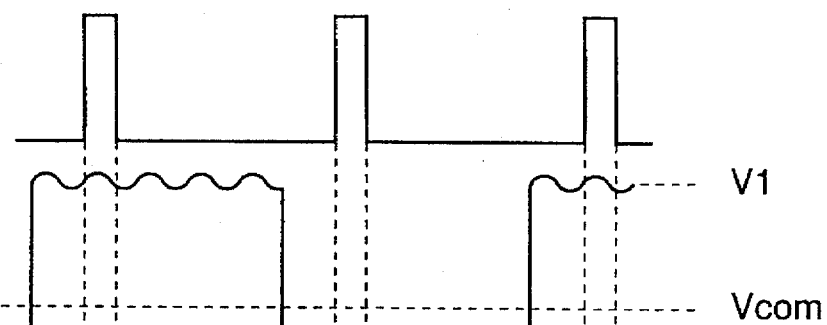
FIG. 3A PRIOR ART
FIG. 3B PRIOR ART
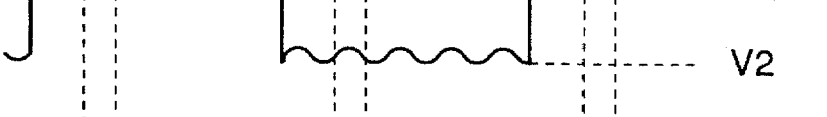
FIG. 3C PRIOR ART
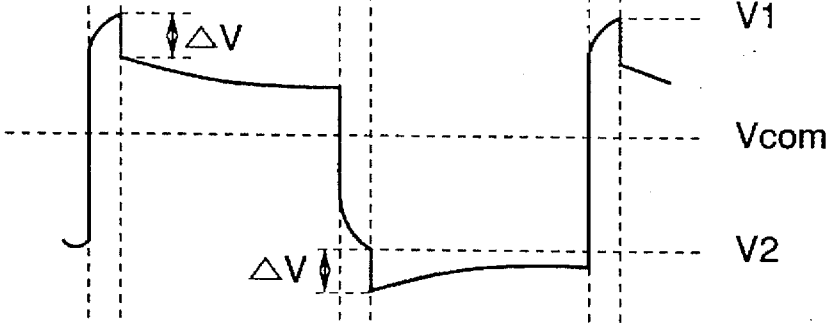
FIG. 3D PRIOR ART
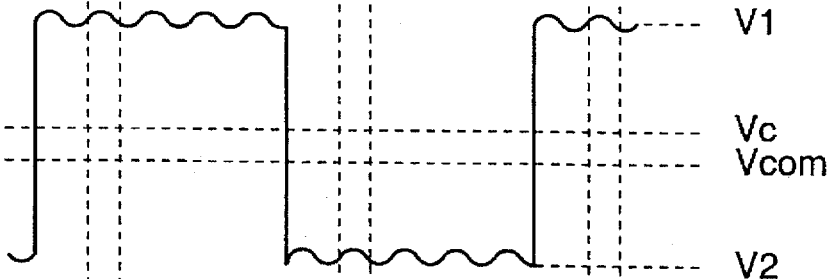
FIG. 3E PRIOR ART
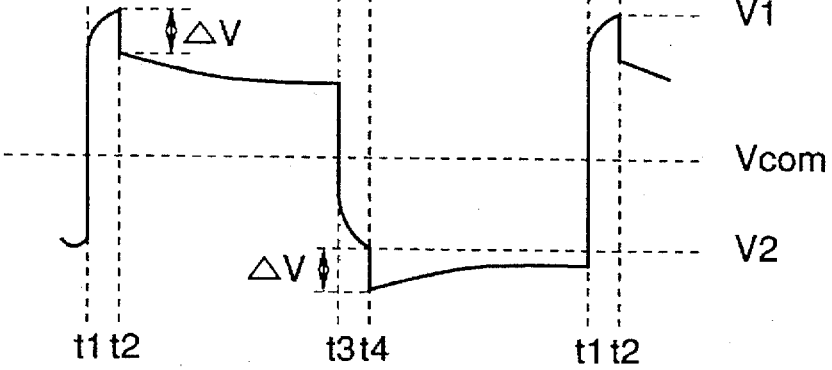

HEAD-MOUNT DISPLAY WITH OPPOSITE POLARITY REVERSAL FOR LEFT AND RIGHT SIDES

BACKGROUND OF THE INVENTION

1. Field of the Invention

The invention relates to a display device using a liquid-crystal panel and a method of driving the same, more particularly to a display device using two liquid-crystal panels for which a method of driving has been devised and a method for driving the above-described display device.

2. Related Background Art

FIG. 1 shows an example of a schematic configuration of an XY-matrix display device using liquid crystal. Referring to FIG. 1, a reference number 1 designates a switching device comprising a field-effect transistor (FET), 2 a liquid crystal cell and 3 a capacitor to hold signal charges. Reference numbers 4R, 4G and 4B designate a switching device comprising a FET respectively, 5 a shift register and 6 an input terminal for pulses to drive the above-described shift register 5. A reference number 7 designates a shift register, 8 an input terminal for pulses to drive the above-described shift register 7, and 9R, 9G and 9B an input terminal for a video signal for a primary color of R, G or B respectively. A reference number 10 designates a common electrode for liquid crystal cells, 11 a gate conductor and 12 a vertical signal conductor.

An operation of the above-described liquid crystal display will be described referring to FIG. 1. When a clock pulse of the frequency m times (m: the number of pixels in the horizontal direction of the liquid crystal display (LCD)) as many as a horizontal frequency is input through the input terminal 6 to the shift register 5, the m-row shift register 5 is driven by this drive pulse in order to supply a pulse output from the shift register 5 to each gate of switching devices 4R, 4G and 4B and to turn on switches 4R, 4G and 4B. Video signals R, G and B input through the input terminal 9 (9R, 9G and 9B) are supplied to vertical signal conductors 12 thereby. Each terminal of switching devices 1 is connected to each vertical signal conductor 12 and each other terminal of switching devices 1 is connected to each liquid crystal cell 2 and each capacitor 3. Further, when a clock pulse of a horizontal frequency is input through the input terminal 8 to the shift register 7, the n-row (n: the number of pixels in the vertical direction of the above-described LCD) shift register 7 is driven by this drive pulse. As a result, a pulse output from the shift register 7 is supplied through a predetermined one of horizontal gate conductors 11 to each gate of switching devices 1 and charges equivalent to the potential difference between a signal supplied to the input terminal 9 and voltage supplied to the common electrode 10 are held in each liquid crystal cell 2 and each capacitor 3 when each switch 1 is turned on. At this time, a predetermined voltage is supplied to the common electrode 10. Sequential repetition of this operation for every gate conductor 11 enables to display images for one screen of LCD according to FIG. 1.

Generally, a liquid crystal display is driven in AC to extend the life of the liquid crystal. FIG. 2 shows an example of a block diagram of a liquid crystal display to be driven in AC. Referring to FIG. 2, a reference number 21 designates an input terminal for video signals such as NTSC and PAL, 22 a Y/C separation circuit and 23 a decoder. A reference number 24 designates a signal processing circuit including AGC and γ correction circuit etc., 25 an amplifier, and 26 and 27 non-inverting and inverting amplifiers constituting the amplifier 25 respectively. A reference number 28 designates a switching circuit, 29 a liquid crystal display (LCD) according to FIGS. 3A to 3E and 30 a synchronizing separation circuit. A reference number 31 designates a PLL circuit, 32 a driving circuit to output a drive pulse for driving each circuit and LCD 29, 33 a driver and 34 a reference voltage generation circuit.

An operation of the device according to FIG. 2 will be described. A video signal input through the input terminal 21 is separated into luminance (Y signal) and chrominance (C signal) signals in the Y/C separation circuit 22 and is further converted to primary color video signals of R, G and B in the decoder 23. Each primary color video signal is processed in the signal processing circuit 24. Automatic gain control (AGC) and γ correction are performed in the signal processing circuit 24. Each output from the signal processing circuit 24 is input to non-inverting and inverting amplifiers 26 and 27 in order to amplify up to amplitude required to drive LCD. A video signal input through the input terminal 21 is also input to the synchronizing separation circuit 30 to separate a synchronous signal. The separated synchronous signal is input to the PLL circuit 31, forms a phase-locked loop (PLL) and controls a drive frequency of the driving circuit 32. The driving circuit 32 outputs a drive pulse for each signal processing circuit and also outputs a pulse to drive LCD 29. However, a pulse to drive LCD 29 is amplified up to the amplitude of voltage required to drive LCD in the driver 33 and supplied to LCD 29. The reference voltage generation circuit 34 generates the reference voltage applied to the common electrode of LCD 29 and the voltage is applied to the amplifier 25 to determine DC potential of a signal supplied to LCD 29. Further, the driving circuit 32 generates a pulse to control the switching circuit 28 (SW pulse). That is, the driving circuit 32 switches connection to either "a" or "b" side of the switching circuit 28 at a predetermined timing. Therefore, when each switch in the switching circuit 28 is connected to "a" side, the output of each non-inverting amplifier 26 is supplied to LCD 29 as primary color video signals of R, G and B, and when each switch is connected to "b" side, the output of each inverting amplifier 27 is supplied to LCD 29. That is, positive and negative pulses are alternately supplied to LCD 29 and it means that LCD 29 is driven on AC. The cycle of timing to control the switching circuit 28 may be one frame, one field or one horizontal scanning cycle (1H).

To reduce current consumption, the common electrode for liquid crystal may be also inverted in synchronization with inversion of the polarity of video signals.

However, it is known that flicker occurs in the cycle of inversion if a liquid crystal display is driven in AC as described above. This principle will be described referring to FIGS. 3A to 3E. FIG. 3A shows a signal through each horizontal gate conductor, that is, a signal applied to a gate of a switching device for each pixel. FIG. 3B shows a signal through each vertical signal conductor and FIG. 3C a signal applied to an electrode for each pixel, that is, each liquid crystal cell and capacitor. That is, when a signal at the high (H) level is applied to a gate of a switching device at the time t1, a switching device is turned on and an electrode for each pixel becomes equal to the potential V1 of a positive signal applied to each vertical signal conductor. When the potential of a gate is at the low (L) level at the time t2, a switching device is turned off and a signal written to each liquid crystal cell and capacitor should be held, however, when a switching device is turned off, the potential of an electrode for each pixel is lowered by ΔV by parasitic capacity between a gate and a drain. Further, when a signal at H level is applied to a gate at the time t3, a switching device is turned on and the potential of an electrode for each pixel becomes equal to the potential V2 of a negative signal applied to each signal conductor. Furthermore, when the potential of a gate is at L level at the time t4, a switching device is turned off and the potential of an electrode for each pixel is lowered by ΔV. Therefore, when the LCD is driven in AC with the polarity of a signal inverted for the potential Vcom of the common electrode as shown in FIGS. 3A to 3E, the voltage applied to an electrode for each pixel exhibits an asymmetrical up and down shaped waveform and as a result, flicker occurs.

To solve this problem, the potential Vcom of the common electrode is shifted to the center electrode Vc of a signal applied to each signal conductor in some cases as shown in FIGS. 3D and 3E so that voltage applied to an electrode for each pixel may be symmetrical up and down as much as possible and flicker may be suppressed. However, as liquid crystal contains anisotropy of a dielectric constant even if the above-described action is taken, the capacity of the liquid crystal is changed according to the amplitude of a signal and ΔV is also changed. Therefore, it is difficult to suppress flicker completely.

Therefore, when images were displayed on a display (panel) 102 dedicated to a person's left eye 101 and a display (panel) 104 dedicated to his right eye 103 of a head mounted display 100, shown in a schematic drawing of FIG. 4, it was sometimes difficult to obtain improved image display performance due to flicker caused on the displays 102 for left eye and 104 for right eye respectively.

Particularly, if images to be displayed were in high definition and of many grades, the difference between actual images and ones expected by a user was great and sometimes synthetically good images could not be displayed. Sometimes fatigue of the eyes of the viewer was caused by such flicker.

However, in FIG. 4, a method to adjust the head mounted display 100 to a user's eyes and input signal conductors for signals input to each display of the head mounted display 100 are omitted.

SUMMARY OF THE INVENTION

An object of the invention made to solve the above-described problems is to provide a liquid crystal display device on whose screen no flicker is perceived and a method of driving the same.

Another object of the invention is to provide a liquid crystal display which can better protect a user's eyes from fatigue even if he or she continues to look at the screen for a long time and a method of driving the same.

According to a first aspect of the invention, there is provided a liquid crystal display provided with a means to generate signals for inverting the polarities of video signals to be supplied to first and second liquid-crystal display panels simultaneously in addition to a means to drive the above-described inverted first and second panels comprising a plurality of matrix pixels and provided with a switching device every pixel.

According to a second aspect of the invention, there is provided a liquid crystal display comprising first and second XY-matrix liquid-crystal display panels provided with a switching device and a storage element every pixel, and a liquid crystal drive for supplying video signals of reverse polarities whose polarities are inverted every predetermined cycle to the first and second panels simultaneously.

According to a third aspect of the invention, there is provided a method of driving a liquid crystal display device provided with first and second XY-matrix liquid-crystal display panels with a switching device every pixel so that video signals whose polarities are inverted every predetermined cycle may be supplied to the first and second panels, and the polarities of video signals to be supplied to the first and second panels simultaneously may be reverse.

BRIEF DESCRIPTION OF THE DRAWINGS

FIGS. 3A to 3E are diagrams illustrating the principle by which flicker occurs an AC during;

DETAILED DESCRIPTION OF THE PREFERRED EMBODIMENTS

Figure 1:
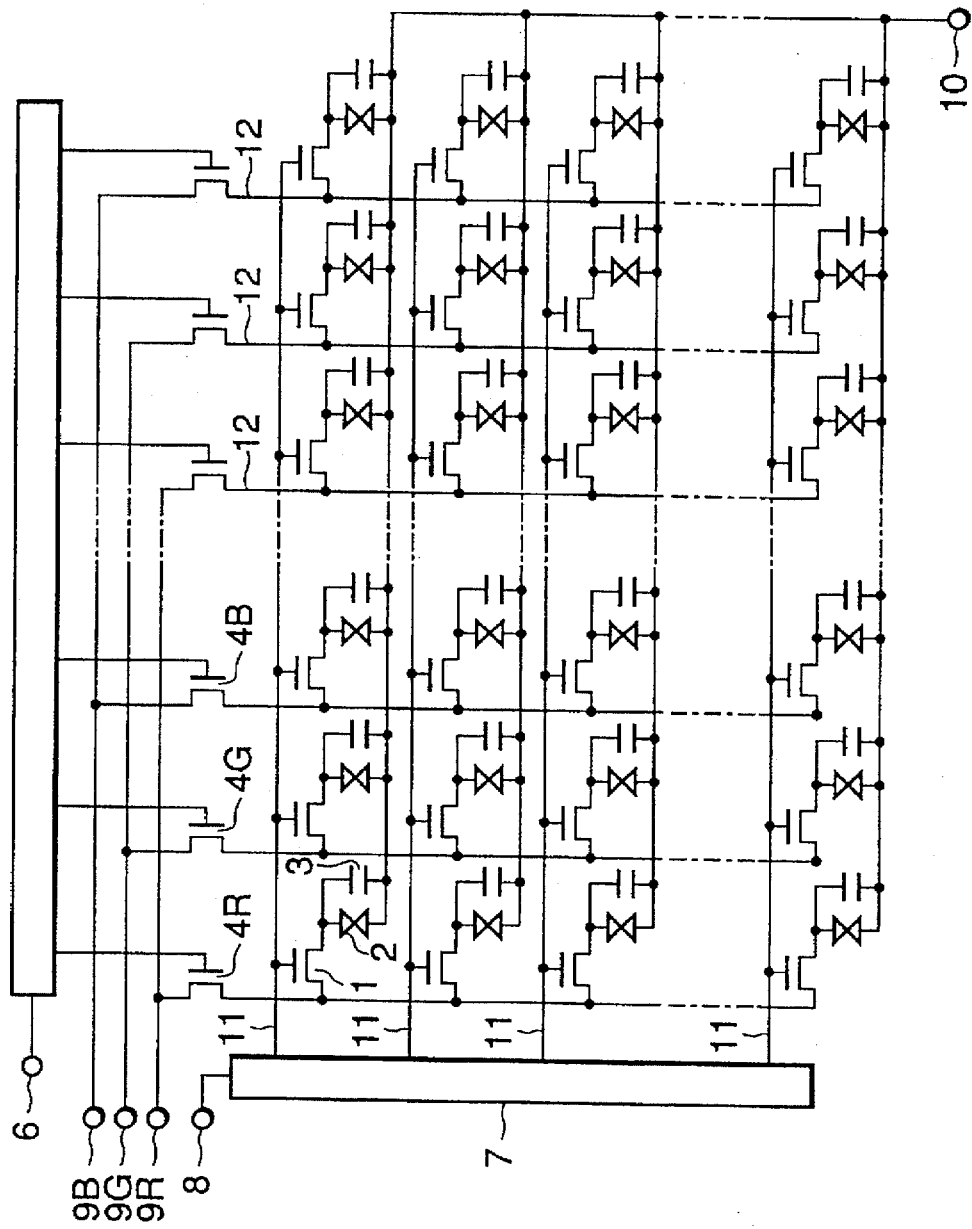
FIG. 1 is a schematic diagram illustrating an example of a XY-matrix display device using liquid crystal.
Figure 2:
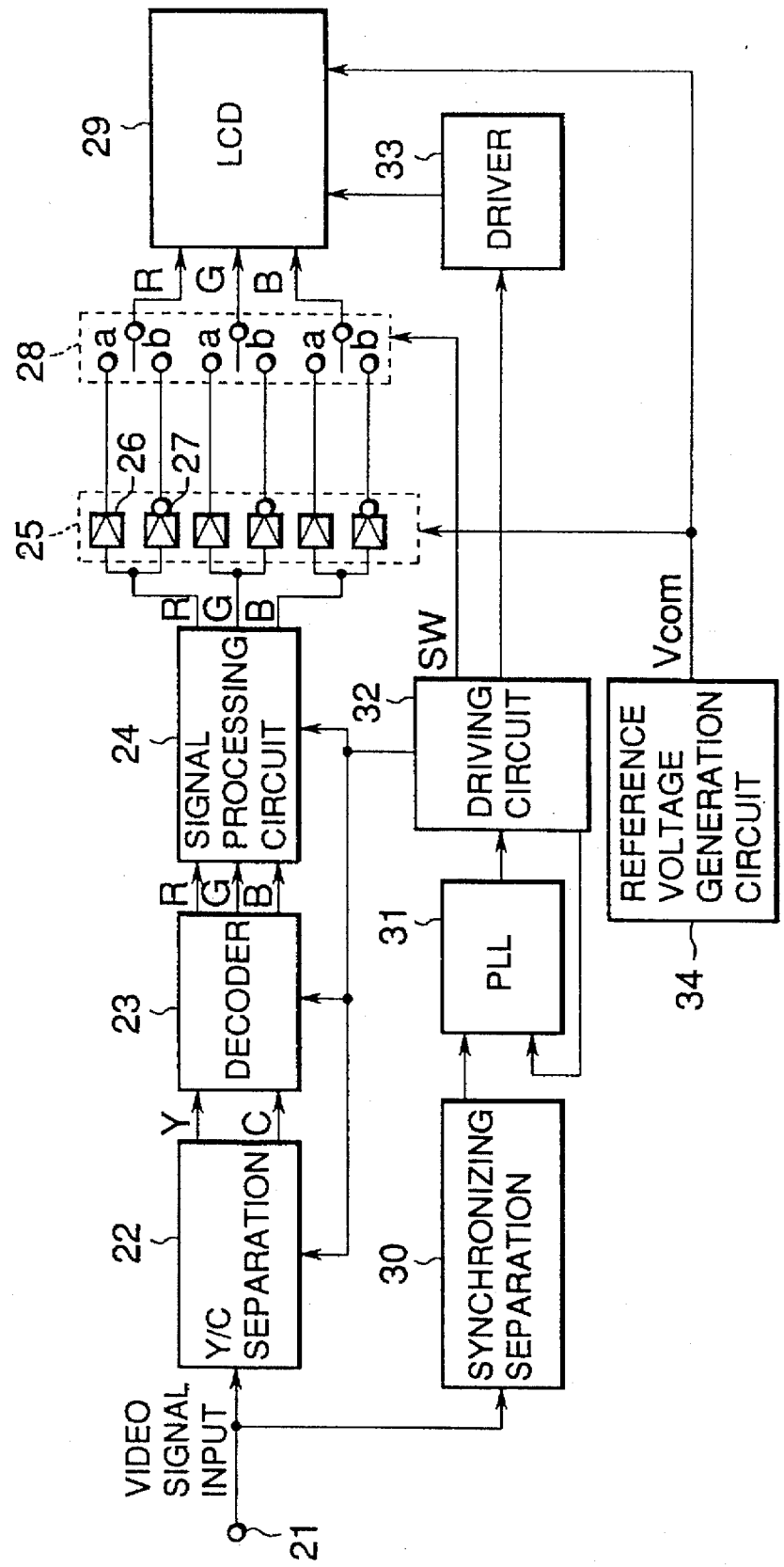
FIG. 2 is a schematic block diagram of a liquid crystal display.
Figure 4:
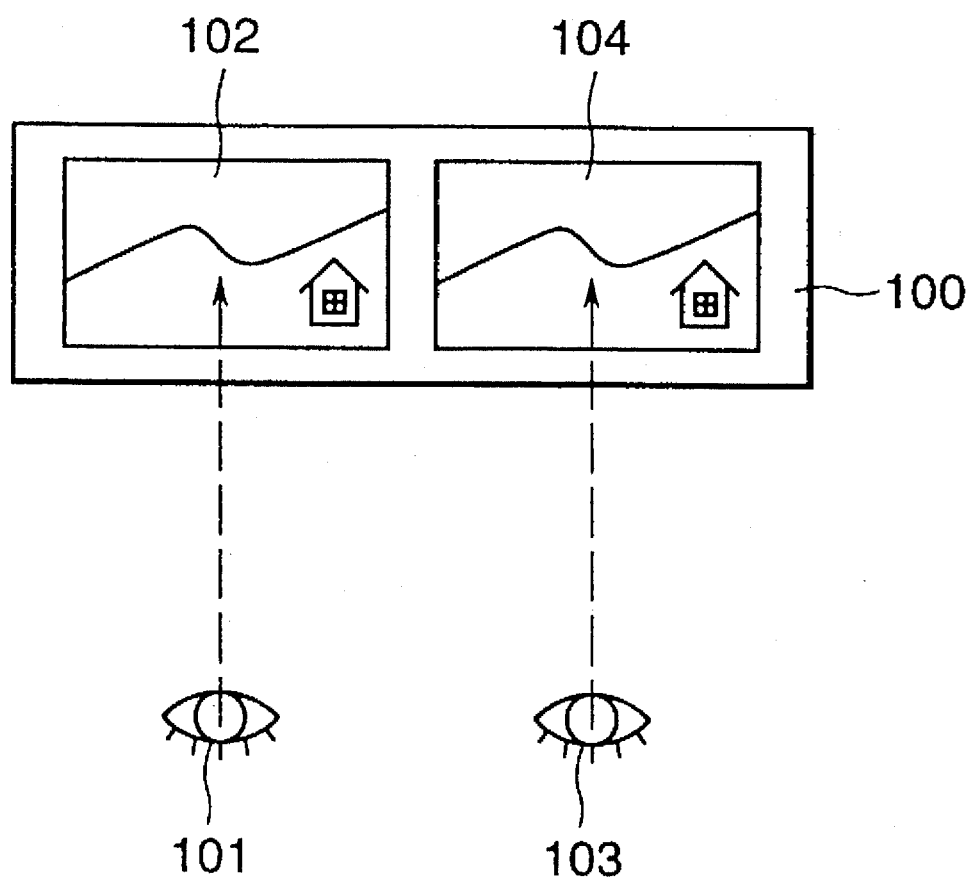
FIG. 4 is a schematic drawing illustrating an example of a liquid crystal display provided with first and second liquid-crystal display panels.

According to the invention, there are provided two liquid crystal displays which are dedicated to respective right and left eyes. The respective liquid crystal displays are driven in AC so that the polarities of signals to be applied to the two displays simultaneously may be inverted. This is because flicker components which occur on each screen of the liquid crystal displays can be removed from a field of view by driving in AC. That is, it is because flicker is amplified enough to be perceived when the two displays are driven on AC so that the polarities of signals may be similar simultaneously, while flicker can be removed by inverting the polarities.

A preferred embodiment according to the invention will now be described referring to the drawings:

FIRST EMBODIMENT

Figure 5:
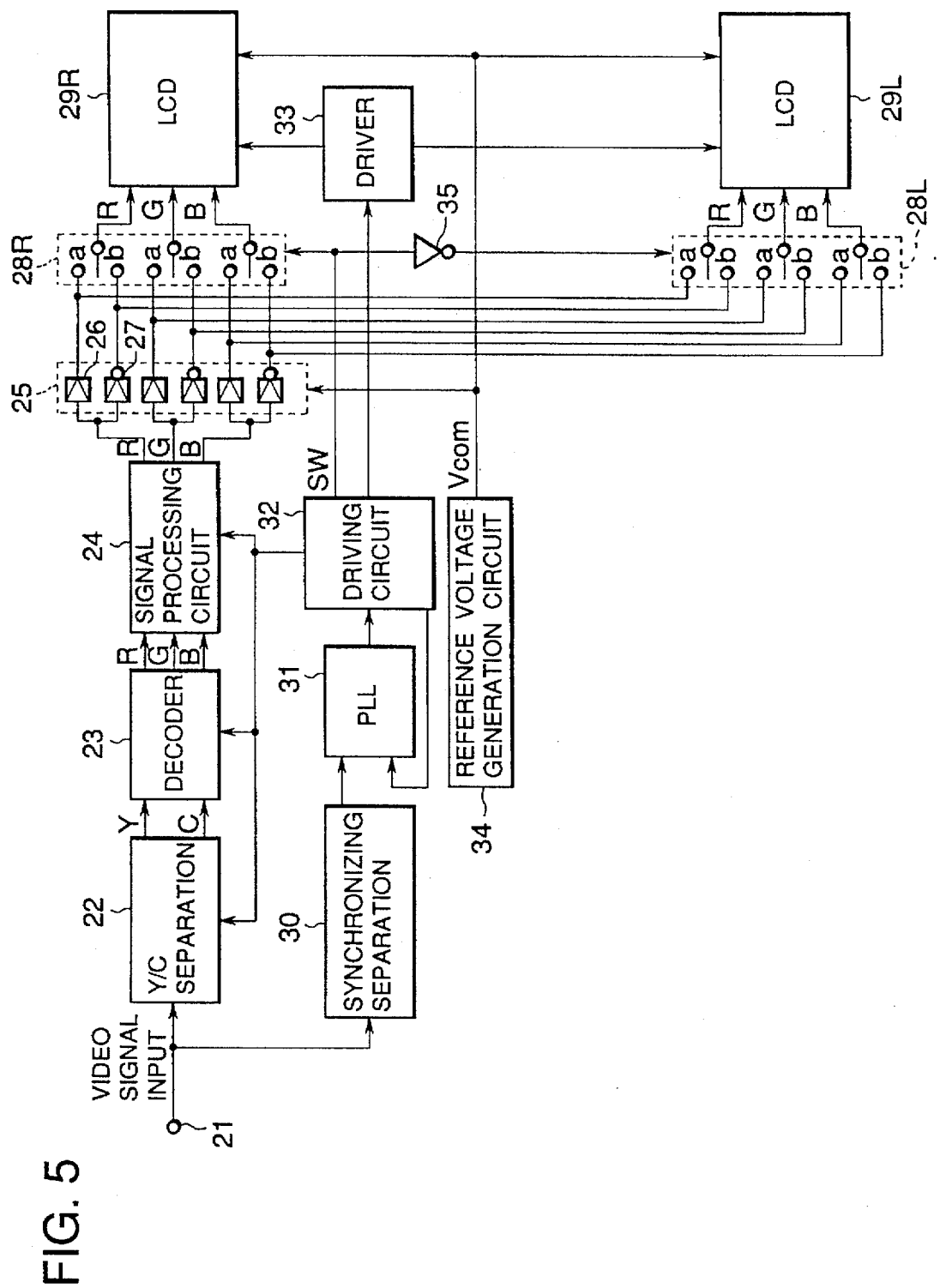
FIG. 5 is a schematic block diagram illustrating a preferred embodiment of a liquid crystal display device according to the invention.

FIG. 5 shows a block diagram of a liquid crystal display according to a first embodiment of the invention. Referring to FIG. 5, a reference number 21 designates an input terminal for video signals, 22 a Y/C separation circuit and 23 a decoder respectively. A reference number 24 designates a signal processing circuit comprising AGC and γ correction circuits, 25 an amplifier, and 26 and 27 non-inverting and inverting amplifiers constituting the amplifier 25 respectively. Reference numbers 28R and 28L designate switching circuits, 29R and 29L liquid crystal displays (LCDs) similar to the liquid crystal display shown in FIGS. 3A to 3E, and 29R designates LCD for a user's right eye and 29L LCD for his left eye. LCDs 29R and 29L are constituted so that LCD 29R can be seen only with his right eye and LCD 29L only with his left eye. A reference number 30 designates a synchronizing separation circuit, 31 a PLL circuit and 32 a driving circuit for outputting drive pulses to drive each circuit, LCDs 29R and 29L. A reference number 33 designates a driver, 34 a reference voltage generation circuit and 35 an invertor.

Operations of devices shown in FIG. 5 will be described. A video signal input through the input terminal 21 is separated into luminance (Y signal) and chrominance (C signal) signals in the Y/C separation circuit 22 and further converted to primary color video signals of R, G and B in the decoder Each primary video signal is processed in the signal processing circuit 24. In the signal processing circuit 24, automatic gain control (AGC) and γ correction are performed.

The output of the signal processing circuit 24 is input to non-inverting and inverting amplifiers 26 and 27 in order to amplify the output up to the amplitude required for driving LCD. Further, a video signal input through the input terminal 21 is also input to the synchronizing separation circuit 30 in order to separate a synchronous signal. The separated synchronous signal is input to the PLL circuit 31 in order to form a phase-locked loop and control a drive frequency of the driving circuit 32.

The driving circuit 32 outputs a drive pulse for each signal processing circuit and also outputs a pulse to drive LCDs 29R and 29L. However, a pulse to drive LCDs 29R and 29L is amplified up to the amplitude of voltage required for driving LCDs in the driver 33 before it is supplied to LCDs 29R and 29L.

The reference voltage generation circuit 34 generates the reference voltage applied to the common electrode of LCDs 29R and 29L and the voltage is also applied to the amplifier 25 to determine DC potential of signals applied to LCDs.

The driving circuit 32 also generates a pulse (SW pulse) to control the switching circuits 28R and 28L. That is, the pulse switches in the switching circuit 28R to either each "a" or "b" side at a predetermined timing and SW pulse is also input to the switching circuit 28L through the invertor 35. Therefore, an inverted pulse of SW pulse input to the switching circuit 28R is input to the switching circuit 28L, when each switch in the switching circuit 28R is connected to "a" side, each switch in the switching circuit 28L is connected to "b" side and when each switch in the switching circuit 28R is connected to "b" side, each switch in the switching circuit 28L is connected to "a" side. As at this time the output of the non-inverting amplifiers 26 is supplied to LCD 29R when each switch in the switching circuit 28R is connected to "a" side and the output of the inverting amplifiers 27 is supplied when each switch in the switching circuit 28R is connected to "b" side as video signals to be supplied to LCD 29R, a pulse with positive polarity and a pulse with negative polarity are alternately supplied and LCD 29R is driven in AC. Further, the output of the non-inverting amplifier 26 is supplied to LCD 29L when each switch in the switching circuit 28L is connected to "a" side and the output of the inverting amplifier 27 is supplied when each switch in the switching circuit 28L is connected to "b" side as video signals to be supplied to LCD 29L. That is, the invertor 35 is a means to generate signals for inverting the polarity of a signal in this embodiment.

Further, as the switching control of switches in the switching circuit 28R is reverse to that of switches in the switching circuit 28L as described above, LCDs 29R and 29L are driven in AC so that the polarity of video signals displayed on LCD 29R may be reverse to that of video signals displayed on LCD 29L simultaneously. At this time, the timing to control the switching circuits 28R and 28L may be every frame, field, horizontal scanning cycle (1H) or unit of pixels. Also, each cycle is not limited to the unit described above. By driving LCDs for a user's right eye and for his left eye in AC so that mutual polarities of video signals may be reverse, the phase of the flicker which occurs on each LCD respectively as a result of driving the LCDS in AC is reverse to each other and flicker occurring on both LCDs is offset. In this embodiment, only inverted drive by video signals is described, however, it is noted that the same effect is obtained even if the common electrode is inverted in synchronization with inversion of video signals.

However, devices shown by reference numbers 22 to 28 and 30 to 35 in FIG. 5 are generically titled as a liquid crystal drive in this embodiment.

SECOND EMBODIMENT

Figure 6:
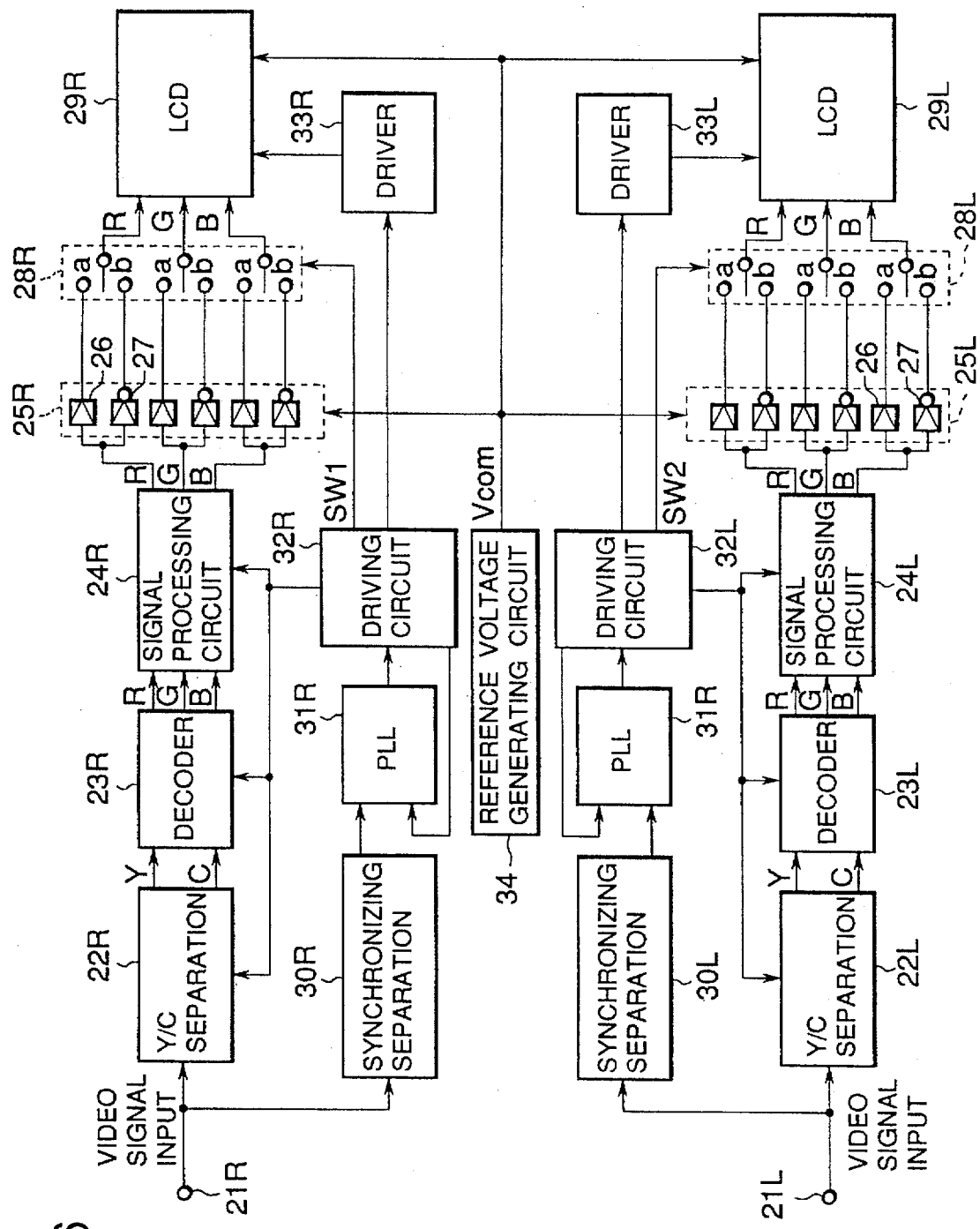
FIG. 6 is a block diagram illustrating another preferred embodiment of a liquid crystal display device according to the invention.

FIG. 6 shows a block diagram of a liquid crystal display according to a second embodiment of the invention. This embodiment applies the invention to a display device for three-dimensional images. As devices in FIG. 6 with the same numbers as those in FIG. 5 show that they are the same components as those in FIG. 5, description will be omitted. Further, characters such as R and L following numbers indicate components for a user's right eye and for his left eye respectively and devices in FIG. 6 with the same number which R and L follow show they are the same components as those with the same number which R and L follow in FIG. 5.

Operations of devices shown in FIG. 6 will be described. A video signal input through an input terminal 21R is separated into luminance (Y signal) and chrominance (C signal) signals in a Y/C separation circuit 22R and further converted to primary color video signals of R, G and B in a decoder 23R. Each video signal is processed in a signal processing circuit 24R. In the signal processing circuit 24R, automatic gain control (AGC) and γ correction are performed. The output of the signal processing circuit 24R is input to a non-inverting amplifier 26 and an inverting amplifier 27 in order to amplify it up to amplitude required for driving LCD. A video signal input through the input terminal 21R is also input to a synchronizing separation circuit 30R in order to separate a synchronous signal. The separated synchronous signal is input to a PLL circuit 31R in order to form a phase-locked loop and to control a drive frequency of a driving circuit 32R. The driving circuit 32R outputs a drive pulse for each signal processing circuit and also outputs a pulse to drive LCD 29R. However, a pulse to drive LCD 29R is amplified up to the amplitude of voltage required for driving LCD in a driver 33R in order to supply the amplified pulse to LCD 29R. A reference voltage generation circuit 34 generates the reference voltage to be applied to the common electrode of LCDs 29R and 29L and the voltage is applied to amplifiers 25R and 25L in order to determine DC potential of signals to be applied to LCDs. Further, the driving circuit 32 generates a pulse (SW1 pulse) to control a switching circuit 28R. That is, connection of switches in the switching circuit 28R to either "a" or "b" side is switched at a predetermined timing by the driving circuit 32. At this time, as the output of the non-inverting amplifiers 26 is supplied to LCD 29R when each switch in the switching circuit 28R is connected to "a" side and the output of the inverting amplifiers 27 is supplied when each switch is connected to "b" side as video signals to be supplied to LCD 29R, a pulse with positive polarity and a pulse with negative polarity are alternately supplied to LCD 29R and it means LCD 29R is driven in AC. That is, in this embodiment, the driving circuits 32R and 32L generate pulses to invert polarities.

Further, a video signal input through an input terminal 21L is also processed similarly and is displayed on LCD 29L by AC drive. At this time, if video signals input through the input terminals 21R and 21L represent three-dimensional (3D) images imaged in the coordinate system of compound eyes, images displayed on LCDs 29R and 29L are perceived as 3D images and if the same video signals are input, images are perceived as normal two-dimensional images.

In this embodiment, a control pulse (SW1 pulse) to control the switching circuit 28R and a control pulse (SW2 pulse) to control the switching circuit 28L shall be reverse to each other. For example, assuming that in a case of inversion every field, SW1 is at the high level in odd fields and SW2 is at the high level in even fields, and in a case of inversion every horizontal scanning cycle (1H), SW1 is at the high level on odd lines and SW2 is at the high level on even lines, each switch in the switching circuit 28L is connected to "b" side when each switch in the switching circuit 28R is connected to "a" side, and each switch in the switching circuit 28L is connected to "a" side when each switch in the switching circuit 28R is connected to "b" side. Therefore, as shown in a first embodiment, if two video signals are substantially synchronized, video signals displayed on LCDs 29R and 29L simultaneously are driven in AC so that they may be substantially equal in amplitude to each other and of inverted polarities each other. Even if two video signals are not synchronized, the polarities of video signals displayed on two LCDs at the same phase are reverse to each other. At this time, the timing to control the switching circuits 28R and 28L may be every frame, field, horizontal scanning cycle (1H) or predetermined unit of pixels as shown in a first embodiment.

As described above, in a display device for three-dimensional images, flicker caused by driving LCDs in AC can be also offset. That is, flicker occurring on each LCD respectively is reverse to each other by driving LCDs for a user's right eye and for his left eye in AC so that the polarities of video signals may be reverse to each other and can be offset. In this embodiment, only driving by inverting video signals is described, however, it is noted that even if the common electrode is inverted in synchronization with inversion of video signals, the same effect is obtained.

However, in this embodiment, devices shown by reference numbers 22 to 28 and 30 to 34 in FIG. 6 are generically titled as a liquid crystal drive.

As described above, if respective liquid crystal displays using the total two XY-matrix liquid-crystal display panels which can be seen only with a user's right eye and only with his left eye are driven in AC, flicker components caused on an individual liquid crystal display by AC driving can be removed visually by driving LCDs in AC so that the polarities of signals applied to two liquid crystal displays simultaneously may be reverse to each other according to the invention.

According to the invention, there are provided liquid crystal displays which fatigue a user's eyes less without perceiving flicker even if he looks on the screens for a long time and a method to drive the displays.

It is to be noted that the invention is not limited to the above-described embodiments, but various modifications and changes, as will be readily understood by those skilled in the art, can be made thereto, without deviating from the invention, which is limited only by the appended claims.

What is claimed is:

1. A liquid crystal display device comprising:
    first and second liquid-crystal display panels in each of which a plurality of pixels each provided with a switching device are arrayed in a matrix;
    driving means for driving said first and second liquid-crystal display panels so that they may be inverted; and
    generation means for generating signals for inverting polarities of video signals supplied to said first and second liquid-crystal display panels simultaneously with each other,
    wherein said first liquid-crystal display panel is dedicated to either a user's left or right eye and said second liquid-crystal display panel is dedicated to the user's other eye.

2. A liquid crystal display device according to claim 1, further comprising switching means for selecting either a first polarity or a second polarity opposite to the first polarity, wherein said generation means is connected to the switching means.

3. A liquid crystal display device according to claim 2, wherein said generation means is an invertor.

4. A liquid crystal display device according to claim 2, wherein said generation means is a driving circuit for said first and second liquid-crystal display panels.

5. A liquid crystal display device according to claim 1, further comprising means for distributing a video signal to said first and second liquid-crystal display panels.

6. A liquid crystal display device according to claim 1, further comprising means for processing a video signal input to said first and second liquid-crystal display panels respectively.

7. A liquid crystal display device according to claim 1, wherein a storage device is connected to each said pixel.

8. A liquid crystal display device according to claim 7, wherein said storage device is a capacitor.

9. A liquid crystal display device comprising:
    first and second XY-matrix liquid-crystal display panels each having a plurality of pixels, wherein switching and storage devices are provided for every pixel; and
    a liquid crystal drive to supply video signals, whose polarities are inverted every predetermined cycle, to said first and second liquid-crystal display panels so that the polarities of video signals supplied to said first and second panels simultaneously may be reversed with respect to each other,
    wherein said first liquid-crystal display panel is arranged in a position such that it can be seen only with a user's right eye and said second liquid-crystal display panel is arranged in a position such that it can be seen only with the user's left eye.

10. A liquid crystal display device according to claim 9, wherein each storage device has a common electrode and wherein the polarity of a voltage applied at the common electrode for the storage devices in said first and second liquid-crystal display panels is inverted, the inversion being synchronized with an inversion of polarities of video signals supplied to said first and second panels.

11. A method of driving a liquid crystal display device provided with first and second XY-matrix liquid-crystal display panels each having a plurality of pixels and in which a switching device is provided for every pixel, said method comprising the steps of:
    simultaneously supplying video signals whose polarities are inverted every predetermined cycle to the first and second liquid-crystal display panels, respectively; and
    reversing the polarities of video signals simultaneously supplied to the first and second liquid-crystal display panels with respect to each other,
    wherein the first liquid-crystal display panel is dedicated to either a user's right or left eye and the second liquid-crystal display panel is dedicated to the user's other eye.

12. A method of driving a liquid crystal display device according to claim 11, wherein the predetermined cycle is selected from among a frame cycle, a field cycle, a horizontal scanning cycle and a pixel cycle.

13. A method of driving a liquid crystal display device according to claim 11, wherein the video signals supplied to the first and second liquid-crystal display panels are based upon a common picture signal.

14. A method of driving a liquid crystal display device according to claim 11, wherein the video signals supplied to the first and second liquid-crystal display panels are based upon first and second picture signals, respectively.

15. A head mount display comprising:

display panels for right and left eyes each wired in a matrix arrangement; and a driving circuit for inverting the polarities of image signals per a predetermined period, and outputting the inverted image signals simultaneously to said display panels for the right and left eyes, wherein said driving circuit outputs, to said display panels for the right and left eyes, the image signals inverted to each other.

16. A display according to claim 15, wherein said driving circuit comprises an inverter for outputting, to said display panels for the right and left eyes, the image signals inverted to each other.

17. A display according to claim 15, wherein said driving circuit comprises driving units provided separately for said display panel for the right eye and said display panel for the left eye.

18. A display according to any one of claims 15–17, wherein said predetermined period comprises any one of a frame period, a field period, a horizontal scanning period and a pixel period.

19. A display according to claim 18, wherein said display panels for the right and left eyes are liquid display panels.

20. A display according to claim 19, wherein each of said liquid display panels has a memory element.

21. A display according to claim 20, wherein said memory element is a capacitor.

22. A method for driving a head mount display, said method comprising the steps of inverting the polarity of an image signal per a predetermined period; and outputting to a display panel for a right eye and to a display panel for a left eye, wherein in said outputting step image signals the polarities of which have been inverted with respect to each other are respectively outputted simultaneously to the display panels for the right and the left eyes.

* * * * *

UNITED STATES PATENT AND TRADEMARK OFFICE
CERTIFICATE OF CORRECTION

PATENT NO. : 5,670,970

DATED : September 23, 1997

INVENTOR(S) : YASUYUKI YAMAZAKI

Page 1 of 2

It is certified that error appears in the above-identified patent and that said Letters Patent is hereby corrected as shown below:

COLUMN 2

Line 42, "on" should read --in--.

COLUMN 4

Line 14, "an AC during;" should read --in AC driving;--;
Line 36, "on" should read --in--;
Line 41, "drawings:" should read --drawings.--; and
Line 63, "invertor." should read --inverter.--.

COLUMN 5

Line 3, "decoder" should read --decoder 23.--;
Line 32, "invertor 35." should read --inverter 35.--;
Line 52, "invertor 35" should read --inverter 35--; and
Line 63, "unit" should read --units--.

COLUMN 8

Line 15, "invertor." should read --inverter.--.

UNITED STATES PATENT AND TRADEMARK OFFICE
CERTIFICATE OF CORRECTION

PATENT NO. : 5,670,970

DATED : September 23, 1997

INVENTOR(S) : YASUYUKI YAMAZAKI

It is certified that error appears in the above-identified patent and that said Letters Patent is hereby corrected as shown below:

<u>COLUMN 10</u>

Line 16, "of" should read --of:--.

Signed and Sealed this

Second Day of June, 1998

BRUCE LEHMAN

*Attest:*

*Attesting Officer*    *Commissioner of Patents and Trademarks*